United States Patent [19]

Kaiser et al.

[11] Patent Number: 5,405,016
[45] Date of Patent: Apr. 11, 1995

[54] METHOD TO SEPARATE OBJECTS OF AN OBJECT MIXTURE AND FACILITY TO IMPLEMENT SUCH A METHOD

[75] Inventors: Dieter Kaiser, Dortmund; Franz Wintrich, Essen, both of Germany

[73] Assignee: RWE Entsorgung Aktiengesellschaft, Essen, Germany

[21] Appl. No.: 166,441

[22] Filed: Dec. 13, 1993

[30] Foreign Application Priority Data

Dec. 12, 1992 [DE] Germany .................. 42 41 262.5

[51] Int. Cl.⁶ ............................................. B07C 5/12
[52] U.S. Cl. ................................... 209/552; 209/659
[58] Field of Search ............... 209/552, 659, 675, 660

[56] References Cited

U.S. PATENT DOCUMENTS

| | | | |
|---|---|---|---|
| 3,242,342 | 3/1966 | Gabar | 209/552 |
| 4,214,663 | 7/1980 | Schopp et al. | 209/552 |
| 5,193,685 | 3/1993 | Trevithick | 209/552 |
| 5,209,355 | 5/1993 | Mindermann | 209/3.1 |

FOREIGN PATENT DOCUMENTS

| | | | |
|---|---|---|---|
| 36237 | 3/1980 | European Pat. Off. | 209/659 |
| 128615 | 6/1948 | Finland | 209/659 |
| 4018757 | 12/1991 | Germany . | |
| 4021882 | 1/1992 | Germany . | |
| 4125045 | 2/1993 | Germany . | |
| 4212713 | 10/1993 | Germany . | |

*Primary Examiner*—Kenneth W. Noland

[57] ABSTRACT

The present invention relates to a method for separating objects from object mixtures, and to a facility for implementing the method, whereby the object mixture is supplied to a vibrating apparatus, on which the object mixture with simultaneous object separation is moved towards a conveying device which receives the separated objects separated from each other, whereby objects not being sufficiently separated for separate supply to the conveying device due to insufficient separation on the vibrating apparatus are fed to another conveying device which enables to return the objects to the vibrating apparatus.

16 Claims, 2 Drawing Sheets

METHOD TO SEPARATE OBJECTS OF AN OBJECT MIXTURE AND FACILITY TO IMPLEMENT SUCH A METHOD

DESCRIPTION OF THE INVENTION

The present invention relates to a method for separating objects from object mixtures, and to a facility for implementing the method, whereby the object mixture is supplied to a vibrating apparatus, on which the object mixture with simultaneous object separation is moved towards a conveying means which receives the separated objects separated from each other, whereby objects not being sufficiently separated for separate supply to the conveying means due to insufficient separation on the vibrating apparatus are fed to another conveying means which enables to return the objects to the vibrating apparatus.

Separating and sorting are of importance for industry, trade and households. Even today manual labour is still employed to carry out such chores despite the availability of sophisticated, fully automatic separation plants which identify specific objects on the basis of features such as size, form, colour, logos, company marks and the like, and initiate sorting means in order to sort the identified objects out as for instance in the foodstuff industry, where poor-grade products are sorted out e.g. in packing coffee beans and other food and luxury goods.

Developments of this type are also known in the field of recycling valuable components from waste.

Thus, according to DE-OS 40 18 757 the different thermal heat absorption of electrically conductive and non-conducting waste materials is advantageously used for sorting such materials, whereby mixture components separated on a conveyor belt are radiated with infrared radiation, the different heat dissipation is measured by heat sensors, and a sorting means is put into operation by signals transmitted from the sensor unit.

DE-OS 40 21 882 describes a method to identify various plastics in which a mixture of different plastics as for instance present in wastes is radiated with microwaves. In this method, too, the different heat dissipation, preferably measured by means of a pyrometer, is used to actuate a sorting means.

DE-OS 42 12 713 discloses a system for reutilization of receptacles in which surface patterns too are detected and evaluated for identification by the identifying station. On page 2 of the description is explained that characteristic patterns such as diamond patterns, bump patterns and grooves on the receptacles are set down by profiling already during manufacturing operations.

DE-OS 41 25 045 discloses a method for sorting waste mixtures by radiating the waste objects with electromagnetic and/or acoustic waves, receiving the waves incidenting from the radiated waste objects in a signal processing unit for identification of the waste objects by image generation, and transmitting signals from the signal processing unit to a sorting means which sorts the identified waste product out. The signal processing unit detects features such as external object shape, e.g. bottle, cup, tube, cubic and other shapes as well as logos, product names, company and manufacturer names respectively, trademarks and colours.

A very substantial requirement for effective sorting is the so-called segregation of individual objects from object mixtures, since individual objects can be identified accurately and reliably only if the object to be identified is sufficiently spaced from other objects.

In automatic sorting plants, object mixtures are usually separated by feeding them onto a conveyor belt with a defined feeding speed. However, experience shows that a substantial proportion of objects cannot be sufficiently separated from each other when applying this method.

Therefore, the task to be accomplished by those skilled in the art was to improve the separation of objects in order to enable especially a reliable sorting out of individual objects.

The present invention has succeeded in accomplishing this task by providing a method to separate objects from an object mixture according to which the object mixture is supplied to a vibrating apparatus on which the object mixture with simultaneous object separation is moved towards a conveying means which receives the separated objects separated from each other, whereby objects not being sufficiently separated for separate supply to the conveying means due to insufficient separation on the vibrating apparatus are fed to another conveying means which enables to return the objects to the vibrating apparatus.

The invention relates in addition to a facility for implementing the method, and to the application of method and facility to separate objects from object mixtures.

According to the invention, the vibrating apparatus functions for separating individual objects as well as for conveying the objects towards a conveying means. Sufficiently separated objects are transferred from the vibrating apparatus to the conveying means where they are received separated from each other. The separated objects can be fed from the conveying means to collecting vessels, in which identical objects respectively objects identical to a desired degree are collected. Objects not sufficiently separated on the vibrating apparatus for transfer to the conveying means in separate fashion are returned to the vibrating apparatus via another conveying means.

The method and the facility to implement the method according to the invention are adapted especially for separating objects from waste mixtures.

The invention comprises preferably also the separate collection of separated objects, in that the objects taken over by the conveying means in separated and sorted condition respectively are conveyed depending on their characteristic features to collecting means provided for this purpose.

Figure 1:
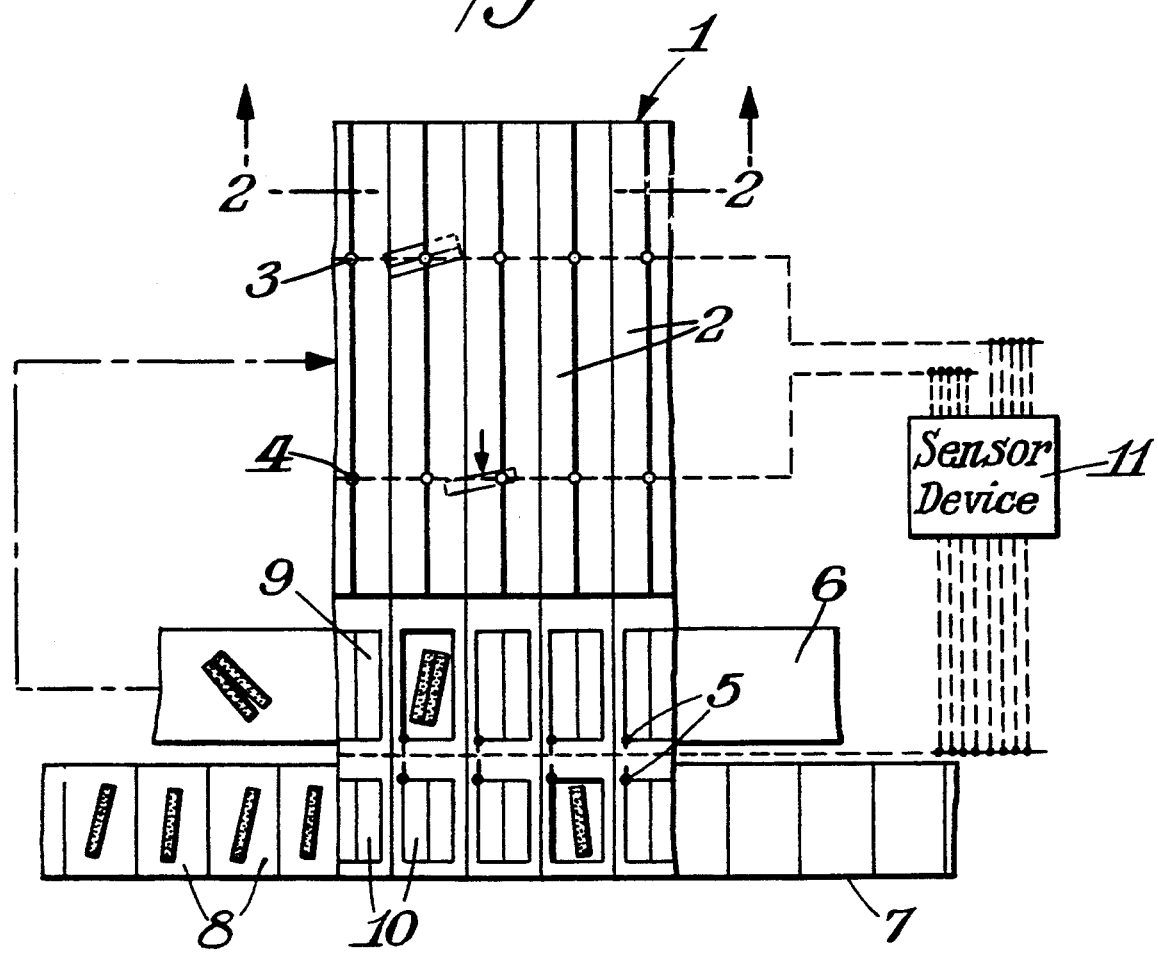
FIG. 1 is a plan view, with parts broken away, illustrating a preferred embodiment of an object-separating apparatus of this invention.
Figure 2:
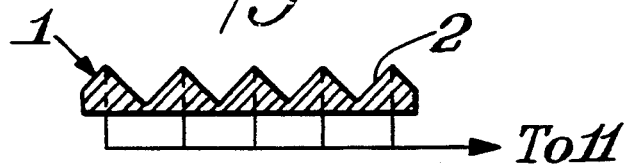
FIG. 2 is a cross-sectional view, taken along line 2—2, of a grooved vibrating-surface means of a separating apparatus of this invention.
Figure 2A:
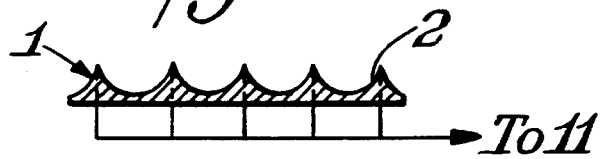
FIG. 2A is a cross-sectional view of an alternative embodiment of a grooved vibrating-surface means of this invention.
Figure 3:
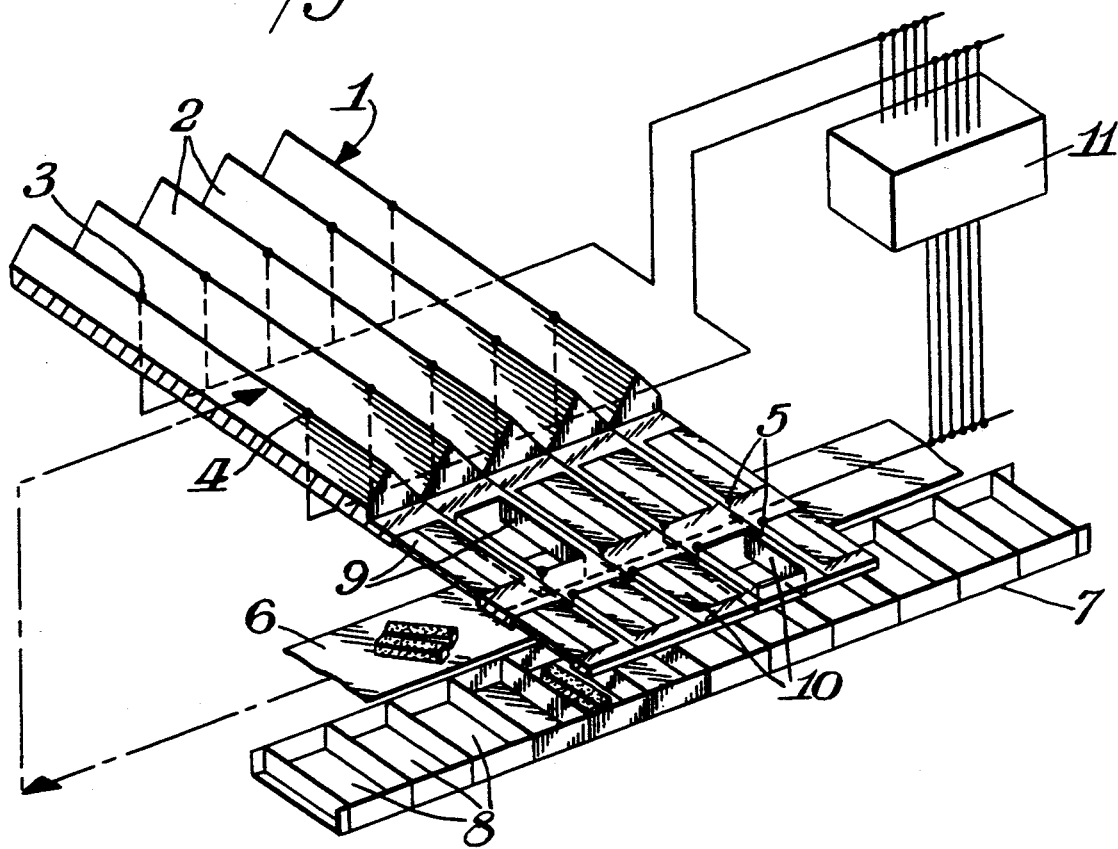
FIG. 3 is a perspective view, with parts broken away, illustrating further the preferred embodiment of the apparatus shown in FIG. 1.

The surface of the vibrating apparatus is preferably groove-shaped, whereby the grooves extend in direction of the conveying means. The surface of the vibrating apparatus may be provided with single or several grooves or completely filled out with grooves. Sensors, which direct objects sufficiently separated on the vibrating apparatus to the conveying means provided for this purpose, and which control the transfer of the objects onto this conveying means in such a way that the objects are separately collected in trays, vessels or cavities and the like provided on the collecting means, are arranged laterally and/or on top of vibrating apparatus and conveying means, and at other points designated for control functions. The separately collected objects can be transferred from the conveying means to a collecting means, preferably also by means of sensor control, in which identical objects or objects identical to a desired degree are collected in larger quantities. The sensors arranged in or on top of the vibrating apparatus function also for directing objects not sufficiently separated to another conveying means that serves for returning such objects to the vibrating apparatus.

Vibrating apparatus and conveying means can be arranged vertically to each other but can be arranged also in such a way that vibrating apparatus and further conveying means extend in the same direction.

According to the invention, it is of importance that vibrating movement and conveying speed on the vibrating apparatus and conveying speed of the conveying means are adapted to each other in such a way that a maximum number of separated objects can be segregated and sorted out respectively.

The invention will now be explained by way of the accompanying Drawing.

1 is the vibrating means provided with several grooves in top view. 2 are sectional views of the vibrating means. 3, 4 and 5 show sensors and their feed lines respectively. 6 is a conveyor belt for returning objects which are not sufficiently separated. 7 shows a conveyor belt for transporting separated objects. 8 are collecting means for separated objects. 9 and 10 are flaps through which objects fall onto the conveyor belts after they have been opened by sensor control. 11 represents a sensor device.

The Drawing shows only one of numerous examples of arrangements functioning in the same or a similar way for object separation and sorting according to the invention. Thus for instance, the individual conveyor belts may differently be arranged. The surface of vibrating apparatus and conveying means may comprise different structures, the opening mechanism of the flaps at the extremity of the vibrating apparatus may be designed differently, the sensors may be arranged differently etc.

The sensor 3 shown in the figure for instance measures the arrival moment of two objects, sensor 4 performs a second measurement. Provided that the distance would be too small after measurement 4, sensor 5 opens one of flaps 9 through which the object arriving at first and positioned in the associated groove falls onto conveyor belt 6, while the remaining individual object falls through flap 10, to which its groove carrying the object is associated, onto conveyor belt 7 and is collected in one of the collecting means 8.

We claim:

1. A method for separating objects from an object mixture, comprising:
    supplying the object mixture to a vibrating surface means,
    moving the object mixture on said vibrating surface means, by means of vibratory movement, toward a first and a second conveying means,
    feeding to said first conveying means individual objects which have been fully separated from each other on said vibrating surface means,
    feeding unseparated or partially separated objects to said second conveying means for return of said unseparated or partially separated objects to said vibrating surface means, and
    returning said unseparated or partially separated objects to said vibrating surface means.

2. A method according to claim 1, additionally comprising the step of collecting said individual objects fed to said first conveying means.

3. A method according to claim 1, wherein the object mixture is a waste mixture.

4. A method according to claim 1, wherein said vibrating surface means is provided with a plurality of grooves extending in the direction of the conveying means.

5. A method according to claim 1, wherein said vibrating surface means is provided with a plurality grooves across its entire surface.

6. A method according to claim 1, wherein said first and second conveying means are arranged perpendicularly to said vibrating surface means.

7. A method according to claim 2, wherein said first conveying means is provided with collecting means and wherein said fully separated objects are fed to said first conveying means by moving them onto a surface provided with openable and closeable flaps which open to permit said objects to be transferred into said collecting means.

8. A method as claimed in claim 2, wherein vibrating movement and conveying speed on the vibrating apparatus and conveying speed on the conveying means are controlled to maximize the number of separated objects collected in a collecting means provided for these objects.

9. A method as claimed in claim 8, wherein the conveying speed on the vibrating apparatus and conveying speed on the conveying means are controlled by sensors responsive to movement of the objects during the operation of the method.

10. A method as claimed in claim 1, wherein a sensor responsive to the degree of separation of said object mixture into individual objects on said vibrating surface means controls the feeding of the individual objects to said first conveying means.

11. A method as claimed in claim 2, wherein the individual objects separately fed to said first conveying means are selectively collected in collecting means on said first conveying means, the selective collection being dependent upon characteristic features of said objects.

12. An apparatus for separating objects from object mixtures, comprising:
    a vibrating surface means for separating objects from object mixtures and for moving the objects toward conveying means,
    first conveying means for receiving individual objects fully separated from the object mixture,
    second conveying means for receiving unseparated or partially separated objects and for conveying said unseparated or partially separated objects back to said vibrating surface means, and sensors responsive to the degree of separation of the objects from the object mixture to control feeding of objects to said first and second conveying means.

13. An apparatus as claimed in claim 12, wherein said vibrating means is provided with a plurality of grooves extending in the direction of the conveying means.

14. An apparatus as claimed in claim 12, wherein said vibrating surface means is provided with a plurality of grooves across its entire surface.

15. An apparatus as claimed in claim 12, wherein said first conveying means is provided with collecting compartments for collecting objects fed to said first conveying means, and wherein said apparatus is provided with means responsive to characteristic features of said objects for selectively collecting said objects.

16. An apparatus as claimed in claim 12, wherein the conveying means are arranged perpendicularly to said vibrating surface means.

* * * * *